United States Patent
Allin et al.

(10) Patent No.: US 10,124,251 B2
(45) Date of Patent: *Nov. 13, 2018

(54) VIRTUAL REALITY SYSTEM WITH CAMERA SHOCK-MOUNTED TO HEAD-MOUNTED DISPLAY

(71) Applicant: Oculus VR, LLC, Menlo Park, CA (US)

(72) Inventors: Boyd Drew Allin, Seattle, WA (US); Robin Michael Miller, Redmond, WA (US); Jared I. Drinkwater, Auburn, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,975

(22) Filed: Aug. 16, 2017

(65) Prior Publication Data
US 2017/0340964 A1 Nov. 30, 2017

Related U.S. Application Data

(63) Continuation of application No. 14/850,821, filed on Sep. 10, 2015, now Pat. No. 9,776,084.
(Continued)

(51) Int. Cl.
| | |
|---|---|
| H04N 5/225 | (2006.01) |
| H04N 5/222 | (2006.01) |
| A63F 13/26 | (2014.01) |
| A63F 13/24 | (2014.01) |
| A63F 13/213 | (2014.01) |
| G06F 3/03 | (2006.01) |
| A63F 13/5255 | (2014.01) |

(52) U.S. Cl.
CPC ............ *A63F 13/26* (2014.09); *A63F 13/213* (2014.09); *A63F 13/24* (2014.09); *A63F 13/5255* (2014.09); *G06F 3/0325* (2013.01); *H04N 5/2251* (2013.01)

(58) Field of Classification Search
CPC .. G02B 27/0093; G02B 37/017; G02B 27/01; G02B 27/0172; G06F 3/013; G06F 3/04815; G09G 5/00
USPC .... 348/333.01, 373, 375; 345/7, 8, 156, 419
See application file for complete search history.

(56) References Cited

U.S. PATENT DOCUMENTS

| | | | |
|---|---|---|---|
| 8,957,835 B2 * | 2/2015 | Hoellwarth | G02B 27/017 345/8 |
| 9,411,160 B2 * | 8/2016 | Hosoya | G02B 27/017 |

(Continued)

OTHER PUBLICATIONS

Allin, Office Action, U.S. Appl. No. 14/850,821, dated Oct. 13, 2016, 15 pgs.
(Continued)

*Primary Examiner* — Kelly L Jerabek
(74) *Attorney, Agent, or Firm* — Morgan, Lewis & Bockius LLP

(57) ABSTRACT

A virtual-reality system includes a head-mounted display, a camera protruding from a surface of the head-mounted display, and a compressible shock mount mounting the camera to the head-mounted display. The shock mount is to retract the camera towards the head-mounted display when compressed. The shock mount protects the camera from damage when the head-mounted display is dropped.

19 Claims, 7 Drawing Sheets

Related U.S. Application Data

(60) Provisional application No. 62/175,962, filed on Jun. 15, 2015.

(56) References Cited

U.S. PATENT DOCUMENTS

| | | | | |
|---|---|---|---|---|
| 2005/0121031 A1* | 6/2005 | Ebersole, Jr. | ........... | A62B 9/006 128/201.27 |
| 2012/0306725 A1* | 12/2012 | Hilkes | ....................... | G09G 5/00 345/8 |
| 2012/0326979 A1* | 12/2012 | Geisert | ................. | G06F 3/0304 345/157 |
| 2013/0335546 A1* | 12/2013 | Crane | ..................... | G06F 3/013 348/78 |
| 2014/0152550 A1* | 6/2014 | Beall | ........................ | G06F 3/012 345/156 |
| 2014/0361977 A1* | 12/2014 | Stafford | ............... | G02B 27/0093 345/156 |
| 2015/0198864 A1* | 7/2015 | Havskjold | ............... | G03B 17/02 455/556.1 |
| 2015/0234189 A1* | 8/2015 | Lyons | ................... | G02B 27/0172 345/174 |
| 2015/0370040 A1* | 12/2015 | Georgiev | ............. | G02B 13/007 348/218.1 |
| 2016/0035136 A1* | 2/2016 | Sendai | ............... | G02B 27/0172 345/633 |
| 2016/0274662 A1* | 9/2016 | Rimon | .................... | G06F 3/014 |

OTHER PUBLICATIONS

Allin, Notice of Allowance, U.S. Appl. No. 14/850,821, Jul. 5, 2017, 8 pgs.

\* cited by examiner

VIRTUAL REALITY SYSTEM WITH CAMERA SHOCK-MOUNTED TO HEAD-MOUNTED DISPLAY

RELATED APPLICATIONS

This application is a continuation of U.S. Non-Provisional application Ser. No. 14/850,821, filed Sep. 10, 2015, entitled "Virtual Reality System with Camera Shock-Mounted to Head-Mounted Display," which claims priority to U.S. Provisional Patent Application Ser. No. 62/175,962, filed Jun. 15, 2015, entitled "Virtual Reality System with Camera Shock-Mounted to Head-Mounted Display," which applications are incorporated by reference in their entireties.

TECHNICAL FIELD

This application relates generally to gaming entertainment and virtual-reality systems, and more specifically to virtual-reality systems having an image-capturing device (e.g., a camera) shock-mounted to a head-mounted display (HMD) so as to improve durability of the camera when the HMD is dropped.

BACKGROUND

Gaming entertainment systems typically include virtual-reality gear such as 3D glasses or mats having motion sensors which the user steps on to track the user's feet to give the user a perception of being in virtual reality, and a hand-held controller, game controller, or other controller. A user manipulates the controller to send commands or other instructions to the gaming entertainment system to control a video game or other simulation. For example, the controller may be provided with several buttons or knobs operated by the user, such as a joystick. Each of the buttons or knobs corresponds to a desired action to be carried out on a display of the gaming entertainment or virtual-reality system.

The action carried out on a display or screen of the virtual-reality or gaming system is limited to a representation of a general position of the user while on the mat. The user's physical hand motions such as punching, swinging, or waving and the like are not detectable by the mat, therefore these virtual-reality or gaming systems provide only a limited feeling of "reality" to the user.

Current gaming systems lack an image-capture device having capability of tracking a user's physical hand motions and being shock mounted to a user-mounted display device (e.g., an HMD) in such a manner that a field of view of the image-capture device is not compromised and the image-capture device is electrically coupled to the display device and resists breakage in the event of forceful impact to the user-mounted display device.

SUMMARY

Accordingly, there is a need for a virtual-reality or gaming system having a camera that protrudes outwards from the HMD and is flexibly shock-mounted to the HMD so as to minimize or prevent damage to the camera when the HMD is dropped (e.g., on a hard surface). The camera is configured to absorb the force of impact and collapse by contracting inwards towards the HMD to prevent damage to the camera or prevent separation of the camera from the HMD upon dropping of the HMD. Flexible shock mounting of the camera further allows the field of view of the camera lens to be minimally obstructed by the rest of the HMD as the camera is capable of protruding forward so as to maximize the field of view of the camera. Shock mounting of the camera further allows for pivoting of the camera at a range of angles, and for translation of the camera.

In accordance with some embodiments, a virtual-reality system comprises a head-mounted display, a camera mounted on and protruding from a surface of the head-mounted display, and a compressible shock mount mounting the camera on the surface. The shock mount is to retract the camera towards the head-mounted display when compressed.

In some embodiments, the virtual-reality system further comprises flat flexible circuitry electrically coupling the camera to the head-mounted display. The flat flexible circuitry passes from the camera, through the shock mount, to the head-mounted display.

In some embodiments, the shock mount pivotally mounts the camera so that first and second rotational degrees of freedom (DOFs) of the camera are tightly constrained as compared with a third rotational DOF, and so that first and second translational DOFs of the camera are tightly constrained as compared with a third translational DOF but are loosely constrained as compared with the first and second rotational DOFs.

In some embodiments, the shock mount pivotally mounts the camera so that the camera is configured to be more precisely repositioned towards an original position thereof in angular directions of at least one of the first and second rotational degrees of freedom (DOFs) than in an angular direction of the third rotational DOF, and so that the camera is configured to be more precisely repositioned towards the original position thereof in lateral directions of at least one of first and second translational DOFs than in a lateral direction of a third translational DOF.

In some embodiments, the shock mount comprises a spring.

In some embodiments, the shock mount comprises an elastic polymer.

In some embodiments, the elastic polymer comprises a rubber material.

In some embodiments, the camera is pivotally mounted to the head-mounted display to allow the camera to pivot at a range of angles so as to increase a field of view of the camera.

In some embodiments, the camera is a forward-looking camera mounted on a front surface of the head-mounted display via the shock mount.

In some embodiments, the forward-looking camera is configured to detect a motion of at least one hand-held controller.

In some embodiments, the forward-looking camera is adapted to track light emitted by a plurality of light-emitting diodes (LEDs) on the at least one hand-held controller.

In some embodiments, the forward-looking camera is adapted to detect infrared light emitted by a plurality of infrared LEDs on the at least one hand-held controller.

In some embodiments, the forward-looking camera comprises an illumination source to provide light to a plurality of passive reflectors on the at least one hand-held controller, and a sensor to detect light reflected back to the forward-looking camera by the passive reflectors.

In some embodiments, the camera is laterally centered on a bottom portion of the surface of the head-mounted display.

In some embodiments, the surface to which the camera is mounted comprises a transparent material.

In some embodiments, the virtual-reality system further comprises a power source to supply power to the camera and the head-mounted display.

In some embodiments, the surface is a front surface of the head-mounted display.

In some embodiments, the camera has a 180-degree field of view.

In some embodiments, the camera is an infrared camera.

In accordance with some embodiments, a virtual-reality system comprises a head-mounted display, a camera mounted on and protruding from a surface of the head-mounted display, and a compressible shock mount mounting the camera on the surface. The shock mount is to retract the camera towards the head-mounted display when compressed. The virtual-reality system further comprises flat flexible circuitry electrically coupling the camera to the head-mounted display, a hand-held controller comprising a plurality of illumination sources which are configured to provide light that is detectable by the camera, and a power source to supply power to the camera, the head-mounted display and the hand-held controller. The flat flexible circuitry passes from the camera, through the shock mount, to the head-mounted display.

In some embodiments, the camera comprises an illumination source to provide light to a plurality of passive reflectors on the hand-held controller, and a sensor to detect light reflected back to the camera by the passive reflectors.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
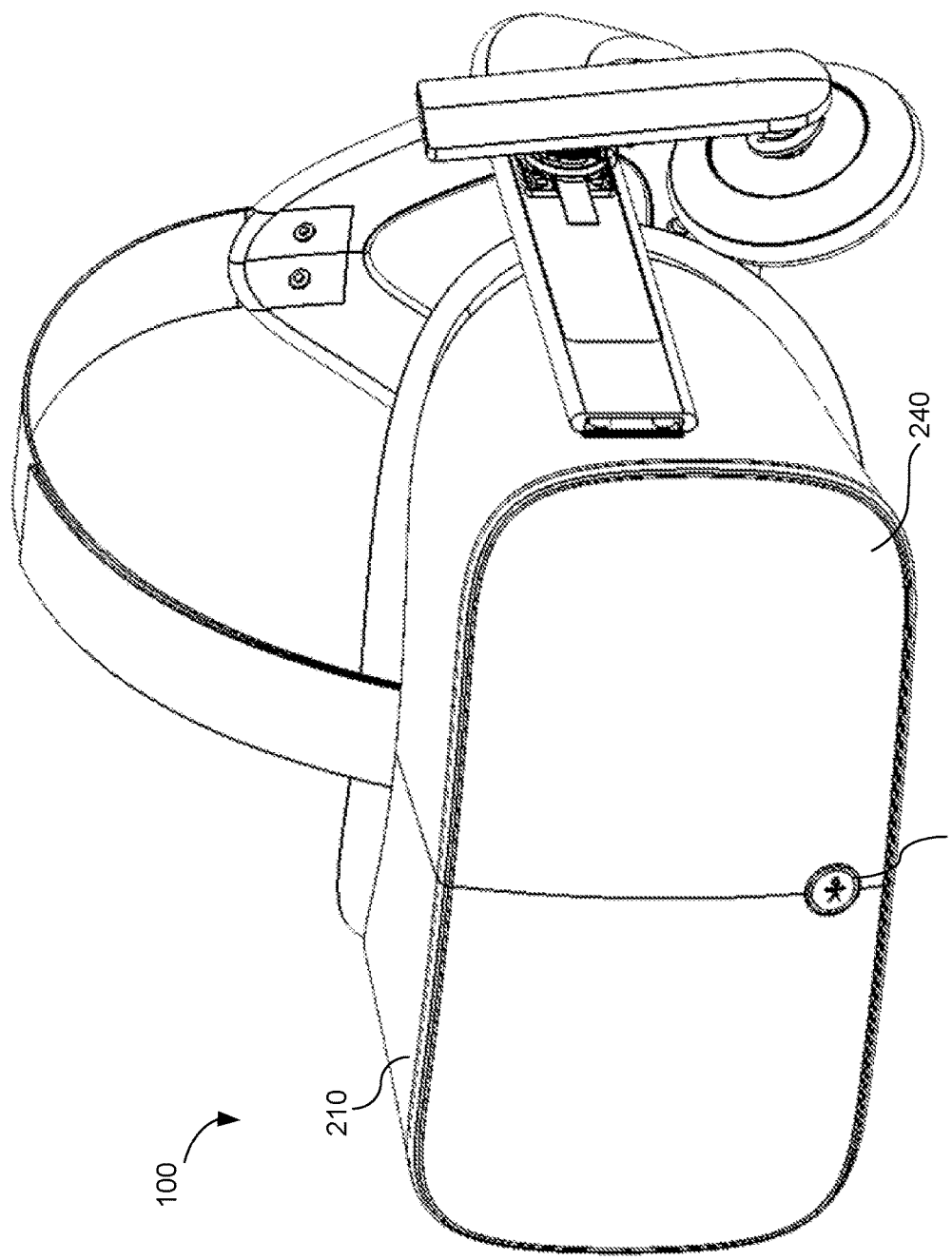
FIG. 1 illustrates an exemplary virtual-reality system including a camera extending from a head-mounted display (HMD) in accordance with some embodiments.

A virtual-reality or gaming system may include a head-mounted display (HMD) worn by a user while playing a video game or carrying out some other virtual reality activity in order to view a subject image in virtual reality. While playing the game or carrying out the virtual-reality activity, the user may become so immersed in the game as to vigorously move their hands and shake their head (e.g., rocking out while playing an electric guitar in a band game) and as a result the HMD may drop from the user's head to the ground. A user also may accidentally drop the HMD while holding it, putting it on, or taking it off. It is desirable to mount the camera to the HMD in such a way to prevent the camera from separating from the HMD upon impact of force from the dropped HMD. Further, it is desirable to mount the camera in such a way as to increase a field of view of the camera (e.g., for viewing a hand-held controller of the virtual reality system) so as to provide an enhanced virtual-reality experience.

Accordingly, in some embodiments virtual-reality systems have cameras that protrude from and are shock-mounted to their HMDs and configured to absorb force of impact, so as to minimize or prevent damage to the camera and/or separation from the HMD when the HMD is dropped (e.g., on a hard surface).

Furthermore, in some embodiments virtual reality systems have cameras that are mounted in such a manner so as to be capable of detecting physical positions of hand-held controllers to allow simulation of actual hand movements of users holding the hand-held controllers by tracking of the users' hand movements, thereby enhancing the virtual-reality experience. The detected positions and movements of the hand-held controllers may be used as additional commands to control various aspects of the game or other simulation being played.

In some embodiments a virtual-reality system includes a head-mounted display (HMD), a camera mounted on and protruding from a surface of the head-mounted display, and a compressible shock mount mounting the camera on the surface. The shock mount is configured to retract the camera towards the head-mounted display when compressed so as to absorb vibration and shock of force acting on the camera resulting from impact when the head-mounted display is dropped.

In some embodiments, the virtual-reality system further includes at least one hand-held controller with one or more user-input keys, a grip, an outward-facing surface (e.g., of a cage) coupled to the grip, and illumination sources coupled to (e.g., mounted on or embedded in) the outward-facing surface of the controller. The camera may be a forward-looking camera adapted to detect light reflected or emitted by the illumination sources. In some embodiments, the forward-looking camera is directly coupled to and extends from a front surface of the HMD. The HMD uses the forward-looking camera to detect movement of the illumination sources by tracking positions of light reflected or emitted in order to model actions of the user's hand(s) in the virtual-reality system. The camera may detect various movements of the hand-held controller, such as punching movements, throwing movements, hitting movements when playing a sport, and the like. Motions of the hand-held controller correspond to various commands such that the motions are transferred into actions in the virtual reality system.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-input key could be termed a second user-input key, and, similarly, a second user-input key could be termed a first user-input key, without departing from the scope of the various described embodiments. The first user-input key and the second user-input key are both user-input keys, but they are not the same user-input key.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 4B:
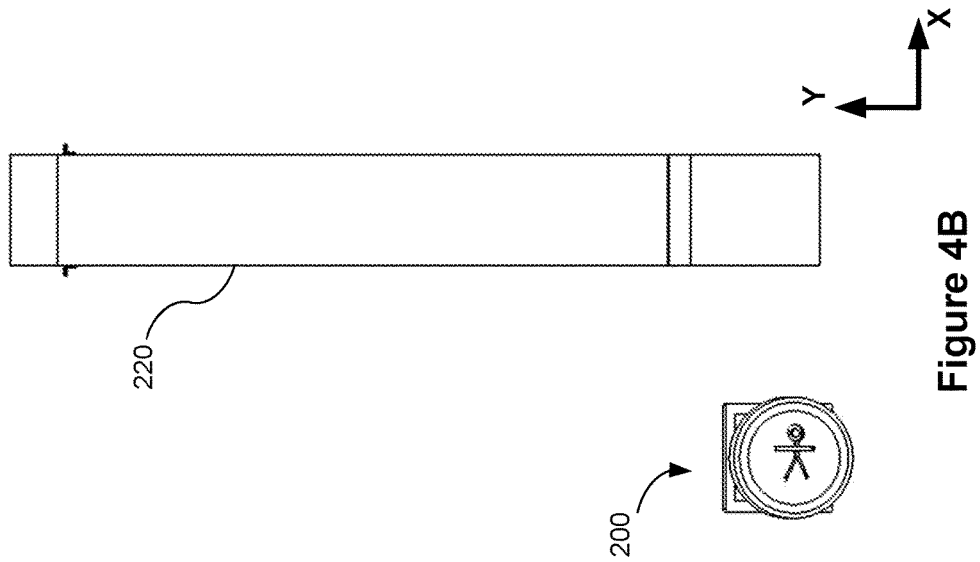
Figure 4A:
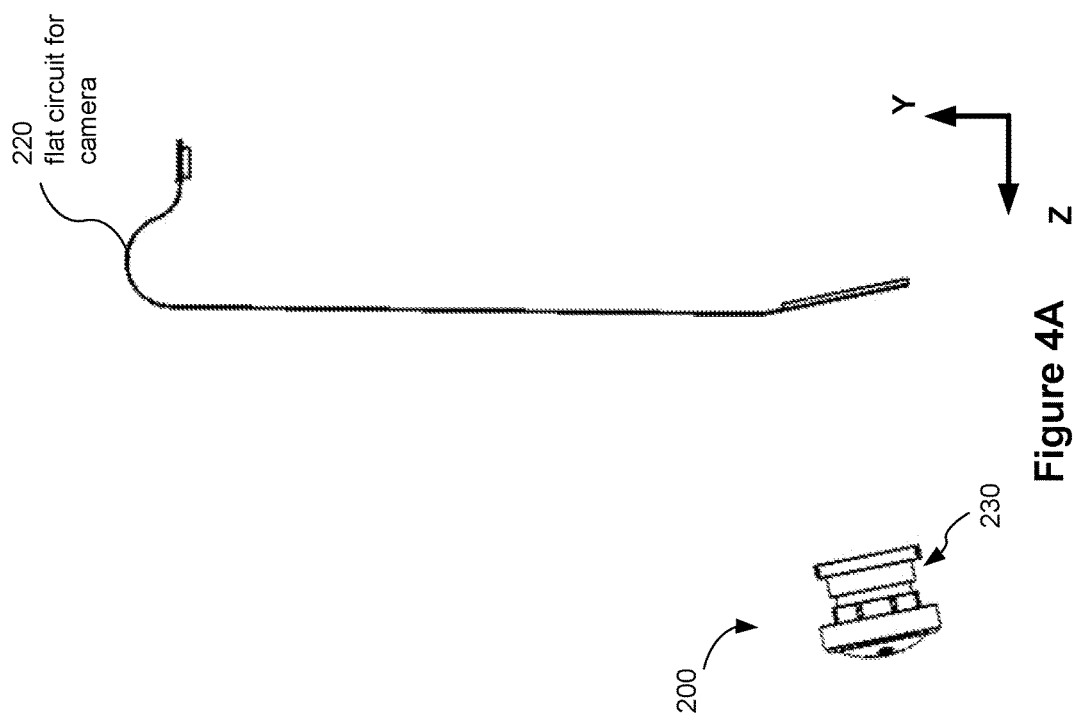

FIG. 1 illustrates an exemplary virtual-reality system 100 including a camera 200 extending from a head-mounted display (HMD) 210 in accordance with some embodiments. In some embodiments, the camera 200 is mounted on and protruding from a surface 240 of the HMD 210, and a compressible shock mount 230 (illustrated in FIG. 4A and FIG. 5) mounts the camera 200 on the surface 240. In some embodiments, the surface 240 is a front surface of the HMD 210. The shock mount 230 is to retract the camera 200 towards the HMD 210 when compressed. By protruding the surface 240 of the HMD 210, the camera 200 has an increased field of view (e.g., as opposed to if it were mounted flush with the surface 240). In some embodiments, this increased field of view increases the detectability of a hand-held controller 300 (shown in FIGS. 6A and 6B) held by a user.

Figure 2A:
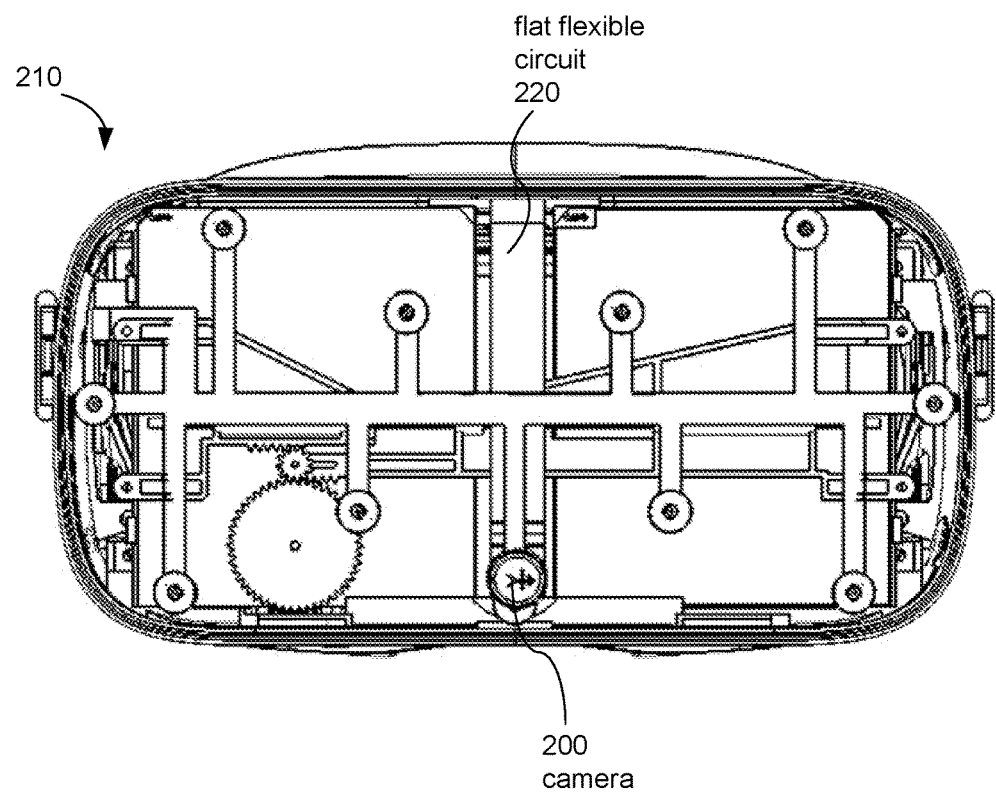
FIG. 2A and FIG. 2B illustrate an inner configuration of the HMD and a front surface of the HMD covering the inner configuration of the HMD on which the camera is mounted in accordance with some embodiments.
Figure 2B:
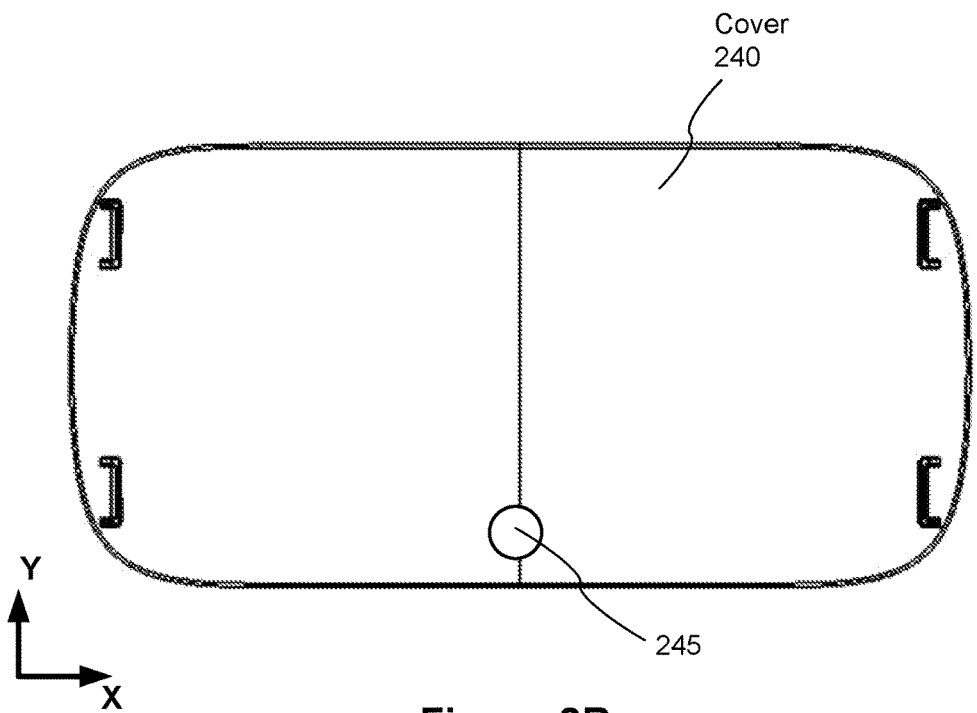
Figure 3:
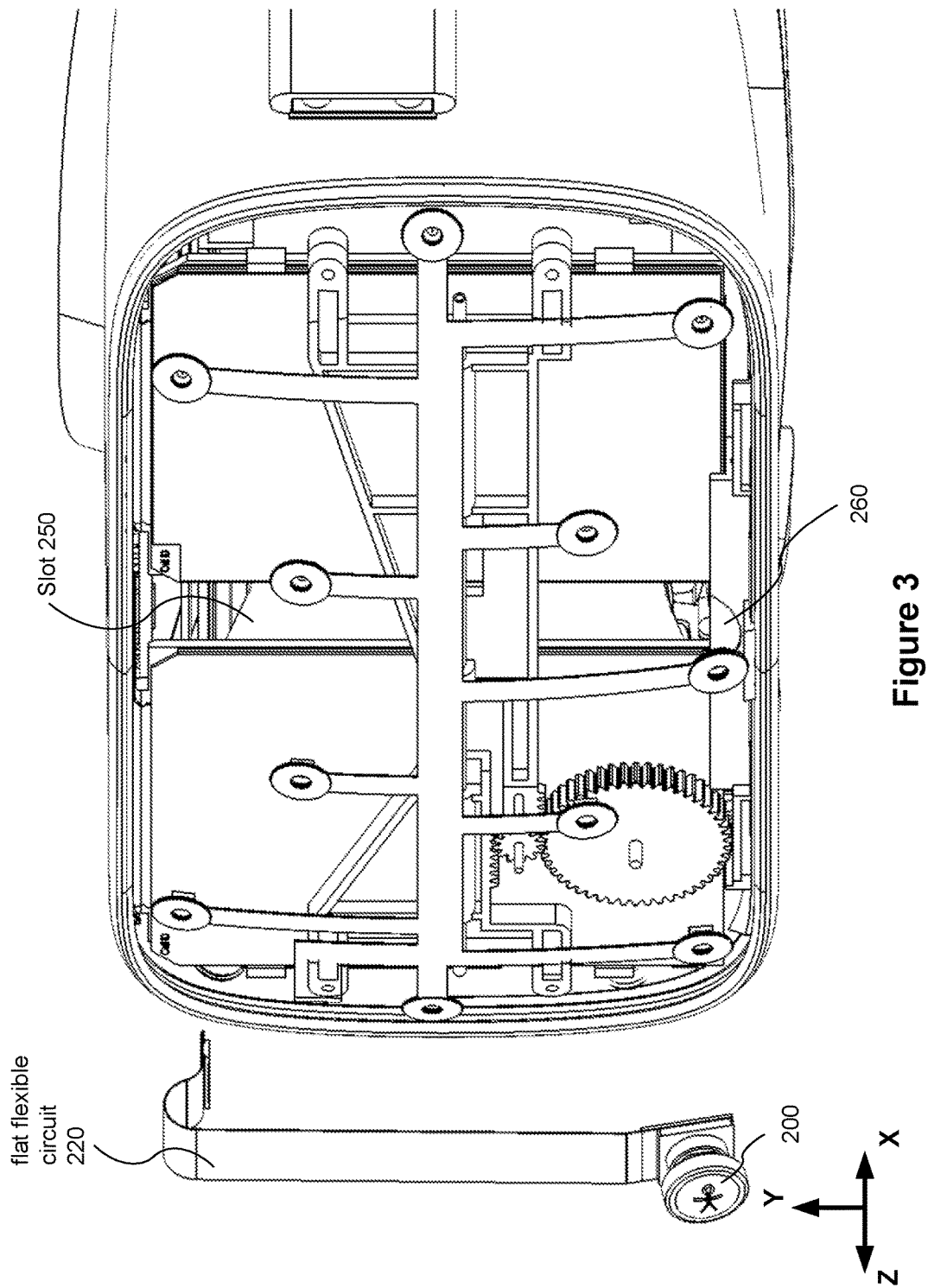
FIG. 3, FIG. 4A and FIG. 4B illustrate flat flexible circuitry electrically coupling the camera to the HMD in accordance with some embodiments.

FIG. 2A and FIG. 2B respectively illustrate an inner configuration of the HMD 210 and the front surface 240 of the HMD covering the inner configuration of the HMD on which the camera 200 is mounted. In some embodiments, a first portion of the camera 200 (i.e., the portion of the camera 200 protruding furthest away from the HMD 210 illustrated in FIG. 5) is configured to be mounted on the front surface 240 of the HMD 210 while a second portion of the camera 200 is housed within the inner configuration of HMD 210. In some embodiments, the front surface 240 includes an aperture 245 through which the camera 200 protrudes. Extending the camera 200 from the front surface 240 of the HMD 210 provides a wide (e.g., 180°) field of view for the camera 200. For example, the camera includes a fish-eye lens with a corresponding field of view. In some embodiments, the front surface 240 to which the camera 200 is mounted comprises a transparent material. Alternatively, the front surface 240 is opaque.

FIGS. 2A, 3, 4A, and 4B illustrate flat flexible circuitry 220 electrically coupling the camera 200 to the HMD 210 in accordance with some embodiments. In some embodiments, the flat flexible circuitry 220 passes from the camera 200, through the shock mount 230, to the HMD 210, or connects to electrical connections that pass from the camera 200 through the shock mount 230. In some embodiments, the flat flexible circuitry is accommodated within a slot 250 between eye cups and displays of the HMD 210. The flat flexible circuitry 220 may comprise a flexible plastic substrate (e.g., polyimide, polyether ether ketone, or transparent conductive polyester) on which the camera 200 is mounted. The flat flexible circuitry 220 provides the advantage that it connects the camera 200 to the head-mounted display 210 flexibly in such a manner that space savings may be realized as compared with traditional rigid circuit boards. Furthermore, in the event of dropping of the HMD, the flat flexible circuitry is configured to flex accordingly so as to prevent a disconnection of the electrical connection between the camera 200 and the HMD 210.

In some embodiments, the flat flexible circuitry 220 comprises a base material and a laminate. The base material is a flexible polymer film which provides the foundation for the laminate and may be selected from the group of materials consisting of at least one of polyester, polyimide, polyethylene napthalate, polyetherimide, and various fluoropolymers and copolymers. In some embodiments, the laminate may comprise a conductive element of metal foil (e.g. copper foil) from which circuit paths are etched.

In some embodiments, the flat flexible circuitry 220 comprises single-sided flexible circuitry having a single conductor layer made of either a metal or a conductive polymer on a flexible dielectric film. Holes may be formed in the film to allow electrical components to pass through for electrically coupling the camera 200 to the HMD 210, e.g., by soldering.

Figure 5:
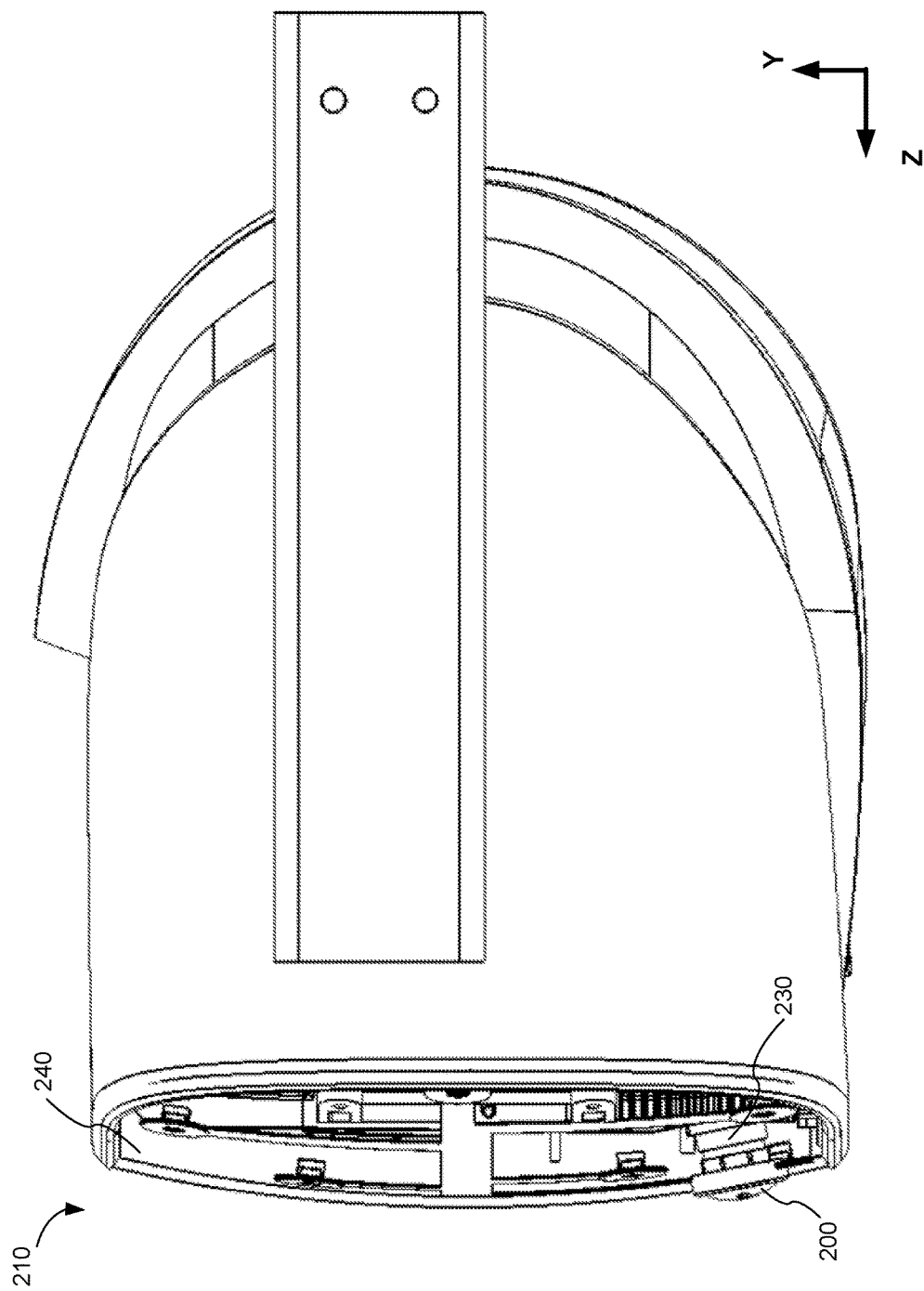
FIG. 5 illustrates the camera shock mounted to and protruding from the front surface of the HMD in accordance with some embodiments.

FIG. 5 illustrates the camera 200 shock mounted to and protruding from a front surface 240 of the HMD 210 in accordance with some embodiments. (The front surface 240 is transparent in FIG. 5 to show interior components of the HMD 210.) In some embodiments, the camera 200 includes a compressible shock mount 230 to shock mount the camera 200 to the front surface 240 of the HMD 210 so as to dampen an impact of force and reduce a vibration caused by such force as a result of the HMD 210 being dropped. The shock mount 230 is configured to retract the camera 200 towards the HMD 210 when compressed so as to absorb at least a portion of the vibration and shock of force acting on the camera 200 resulting from impact when the head-mounted display is dropped.

In some embodiments, the shock mount 230 comprises a spring which is configured to compress inwards towards the front surface 240 of the HMD 210 when the camera 200 experiences a shock of force resulting from dropping of the HMD 210. The spring is configured to expand once the force is removed so as to return the camera 200 to a position protruding forward from the front surface 240 of the HMD 210. This configuration improves durability of the coupling of the camera 200 to the HMD 210 so as to reduce the possibility of the camera 200 being separated from the HMD 210 upon force of impact, and so as to prevent excessive damage to the camera 200.

In some embodiments, the shock mount 230 comprises an elastic polymer with a structure capable of distributing an applied stress (e.g., stress resulting from a shock of force acting on the camera 200 when the HMD 210 is dropped). In some embodiments, the elastic polymer comprises a rubber material capable of converting the kinetic energy of the shock into another form of energy, for example heat, which is then dissipated. The aforementioned configuration yields the advantage that the elastomer (e.g., rubber) will compress upon receiving the initial shock and then return to its original configuration when the stress is removed. This flexibility allows the rubber to reversibly extend.

In some embodiments, the camera 200 protrudes from a surface (e.g. the front surface 240) of the head mounted display so as to increase a field of view of the camera 200, and is pivotally and/or translationally mounted to the HMD 210 to pivot the camera 200 at a range of angles and/or allow for translation in multiple directions, in response to an impact. For example, the camera 200 protrudes from the front surface 240 so as to give the camera 200 a 180-degree field of view of objects (e.g., the hand-held controller 300, FIGS. 6A and 6B).

In some embodiments, the shock mount 230 pivotally mounts the camera 200 so that the camera 200 is configured to be more precisely repositioned to an original position thereof in angular directions of at least one of first and second rotational degrees of freedom (DOFs) than in an angular direction of a third rotational DOF. The shock mount additionally translationally mounts the camera so that the camera is adapted to be more precisely repositioned toward the original position thereof in lateral directions of at least one of first and second translational DOFs than in a lateral direction of a third translational DOF. Repositioning toward the original position occurs upon removal of a force applied to the camera 200 that causes pivoting and/or translation of the shock mount 230.

In some embodiments, the tracking mechanism of the camera 200 of the present invention is adapted to be more sensitive to an angular repositioning error orthogonal to the camera axis than to a rotational repositioning error about the camera axis. The tracking mechanism of the camera 200 is additionally adapted to be more sensitive to a lateral repositioning error than to an axial repositioning error (translational DOF).

Accordingly, the shock mount 230 is configured such that the first and second rotational DOFs of the camera 200 are tightly constrained as compared with the third rotational DOF, and so that the first and second translational DOFs of the camera 200 are tightly constrained as compared with the third translational DOF but are loosely constrained as compared with the first and second rotational DOFs. The aforementioned configuration provides an advantage of not overly-constraining the system while improving repositioning accuracy to the original position of the camera 200 weighted by the camera 200 tracking mechanism sensitivities.

Figure 6A:
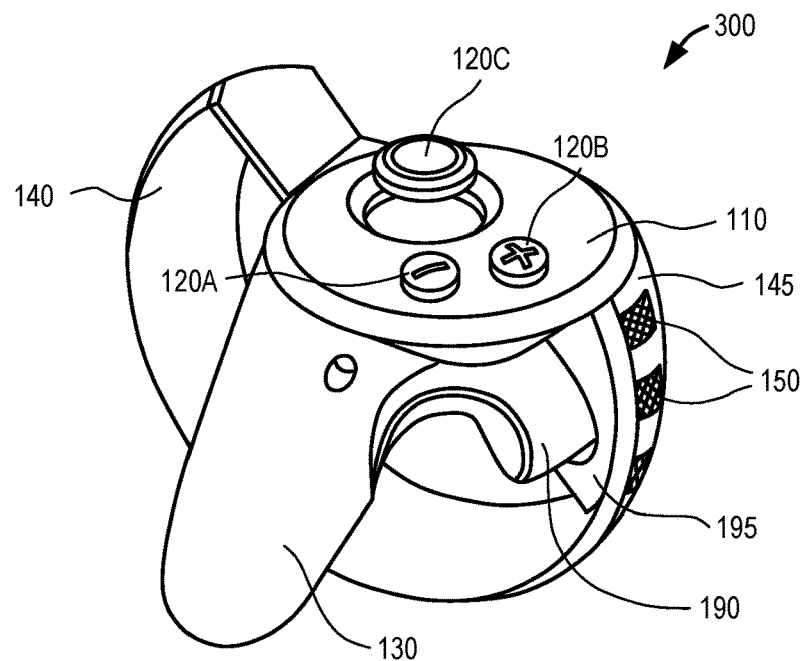
FIG. 6A and FIG. 6B illustrate isometric views of a hand-held controller of the virtual-reality system in accordance with some embodiments.
Figure 6B:
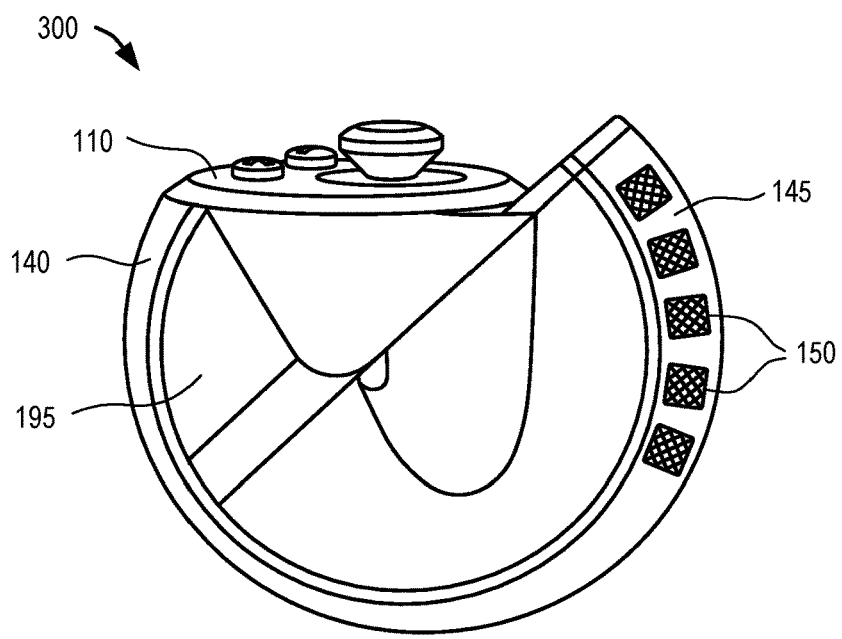

FIG. 6A and FIG. 6B illustrate isometric views of a hand-held controller of the virtual-reality system in accordance with some embodiments.

In some embodiments, the camera 200 is a forward-looking camera mounted on the front surface 240 of the HMD 210 via the shock mount 230. For example, the forward-looking camera 200 is configured to detect a motion of at least one hand-held controller 300. The hand-held controller 300 generally comprises a plurality of user-input keys 120A-120C and 190, a grip 130, an outward-facing surface 145 coupled to the grip 130, and a plurality of illumination sources 150 coupled to (e.g., mounted on or embedded in) the outward-facing surface 145. The illumination sources 150 are configured to emit or reflect light that is detectable by camera 200. The camera 200 protrudes from the front surface 240 of the HMD 210 to detect movement in positions of the illumination sources 150 when the user makes a motion (e.g., waving, swinging, punching, shaking, or any other hand motion) while holding the grip 130 of the hand-held controller 300. The camera 200 thus is mounted proud of the case. By detecting a movement of the illumination sources 150 on the controller 300, the camera is able to capture sequential positions of the controller 300 over time, and thus allow motion of an image subject to be modeled in virtual-reality based on actual physical motions made by the user (e.g., punching, swinging, etc) as described above. The HMD 210 is configured to display a view which shifts as a user shifts their head in a corresponding direction or tilts their head at an angle. The HMD 210 is communicatively coupleable to the controller 300 and the camera 200 so as to be able to display the detected motions of the controller 300 along with motions of the head of the user as those of an image subject of the virtual reality system 100. For example, the HMD 210 communicates wirelessly with the controller 300 and communicates with the camera 200 through the flat flexible circuitry 220.

In some embodiments, the camera 200 is laterally centered on a bottom portion 260 (FIG. 3) of the surface (e.g. front surface 240) of the HMD 210 and extends from (e.g., is mounted to) the HMD 210 (e.g., at a downward facing angle) such that the controller 300 having the plurality of illumination sources 150 is within the field of view of the camera 200 when the user holds the grip 130 in a neutral position. Alternatively, the camera 200 extends from (e.g., is mounted to) a side surface of the HMD 210 or a top surface of the HMD 210. In these examples, the forward-looking camera 200 is electrically and communicatively coupled to the HMD 210 through the flat flexible circuitry 220. Alternatively, the forward-looking camera 200 may be wirelessly coupled to the HMD 210. In some embodiments, the distance at which the forward-looking camera 200 is extendable from the HMD 210 may be adjustable depending on how far away the user holds the controller 300 from the their body.

In some embodiments, the camera 200 includes sensors to sense light emitted or reflected by the illumination sources 150. The camera 200 is configured to sense a position of the controller 300 or illumination sources 150 based on the light emitted. The camera 200 or HMD 210 thus may determine the position and orientation of the controller 300. In some embodiments, based on a distance of the hand-held controller 300 from the user's body, the camera 200 is adapted to either extend away from or retract towards the HMD. In some embodiments, an angle at which the camera 200 faces the controller 102 is also similarly adjustable depending on orientation of the controller 300 and the plurality of illumination sources.

In some embodiments, forward facing camera 200 is positioned to detect the light emitted or reflected by the illumination sources 150 when the outward-facing surface 145 is positioned above the user's hand in the neutral position.

In some embodiments, the camera 200 may be customized for the purposes of the virtual reality system 100. In some embodiments, the camera 200 includes but is not limited to a commercially available camera, such as for example a web-cam, an infrared (IR) capable camera, and/or a USB camera, etc.

In some embodiments, the camera 200 is electrically connected to a power source which may or may not be the same power source providing power to the HMD 210 and the hand-held controller 300. The camera 200 and the HMD 210 may be wireless; therefore, the power source may be one or more batteries.

In some embodiments, the illumination sources 150 are positioned to allow the camera 200 to detect at least six DOFs of the controller 102. The six DOFs are the controller 300 position within x, y and z coordinates of space (translational DOFs) and the controller 300 orientation—which includes the controller 300 yaw, pitch and roll (rotational DOFs). The six DOFs detected by the camera 200 are used to determine the user's movements of the controller 300 and model these movements in virtual-reality.

In some embodiments, the illumination sources 150 are light-emitting diodes (LEDs). In some embodiments, the LEDs 150 are infrared (IR) LEDs. The camera 200 is configured to detect the IR light emitted by the IR LEDs on the controller 300 and record the signals sensed from the emitted light to determine the position and orientation of the controller 300.

In some embodiments, the LEDs 150 may be positioned on the outward-facing surface 145 of the controller 300 in any suitable pattern, order, or array. In some embodiments, the outward-facing surface 145 is an outer surface of a cage 140 coupled to the grip 130. The LEDs may be fixedly or detachably positioned on, and thus coupled to, the cage 140 by any appropriate method. For example, the LED's may be mounted on or embedded within the outer surface 145 of the cage 140. Alternatively, the LEDs may be on a sleeve that surrounds the cage 140 and effectively forms the outer surface 145 of the cage 140. Although the LEDs are described as being positioned on the outer 145 surface of the cage 140, they may additionally or alternatively be coupled to any other surface on the cage 140 and/or the rest of the controller 300.

The LEDs 150 are electrically connected to a power source which may or may not be same power source providing power to the controller 300. The controller 300 may be wireless; therefore, the power source may be one or more batteries. The LEDs may be housed in diffused cases including a current limiting resistor to keep the current from the power source to the LED below the LED's maximum current rating so as to ensure maximum life of the LEDs. The LEDs may be activated when a suitable voltage is applied. By virtue of the LEDs being positioned in an area on the controller 300 detectable to the camera 200, motion of the light produced by the LEDs that is detected by the camera 200 is used as an indication of the positions and motion of the controller 300. In this way, motion of the controller 300 is tracked by the camera 200, allowing for corresponding virtual-reality hand motions to be shown on the HMD 210. For example, when the user makes a punching motion while playing a boxing game, movement of the LEDs in a manner corresponding to a punch may be detected and used to model the user's motion for the image subject displayed on the HMD 210 in the virtual reality system 100. In this way, the present invention provides the advantage of enhancing the virtual reality experience for the user by adding the additional element of hand motions to the image subject.

In some embodiments, the illumination sources 150 are passive reflectors. In some embodiments, the camera 200 is adapted to include an illumination source (e.g., a flash) and to provide light to the passive reflectors. The illumination source may be directly connected to the rest of the camera 200 or may be separate from the rest of the camera 200. The passive reflectors receive light from the camera 200 and reflect the light back in the direction of the camera 200. The camera 200 includes a sensor to detect the light reflected back by the passive reflectors and record the signals sensed from the reflected light to determine the position and orientation of the controller 300.

In some embodiments, the hand-held controller 300 includes the first user-input key 120A and may include one or more additional user-input keys 120B, 120C. A user-input key is a button, knob, switch, thumbstick, directional pad, or any other such part that a user presses or manipulates in some other way to carry out a specific action in a virtual reality system (e.g., during gaming).

In some embodiments, the first user-input key 120A may be selected from the group consisting of a thumbstick, a button, a trigger, and a directional pad. In some embodiments, the first user-input key 120A may be the button selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the hand-held controller 300 further comprises a user-input surface 110 that includes the first user-input key 120A. The user-input surface 110 includes a plurality of user-input keys 120A, 120B and 120C. Alternatively, the user-input surface includes a single user-input key. Thus, the user-input surface 110 is a surface on the controller 300 where the user delivers an input by activating one or more user-input keys (e.g., by pressing a button or pushing a knob) corresponding to an action that the user desires to carry out in the virtual-reality system 100.

Each of the user-input keys 120A, 120B and 120C is configured to communicate with the virtual-reality system 100 so as to translate an operation of the corresponding user-input key by the user into a corresponding action of the image subject displayed on the HMD 210 of the virtual reality system 100.

In some embodiments, the user-input surface 110 includes a plurality of user-input keys including the first user-input key 120A, and respective user-input keys 120B, 120C of the plurality of user-input keys are selected from a group consisting of a thumbstick, a button, a trigger, and a directional pad.

In some embodiments, a home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would need to reach less to press the more frequently used user-input keys, thereby mitigating the possibility of ergonomic ailments associated with overreaching and overstretching fingers.

In some embodiments, the grip 130 is coupled to the user-input surface 110. The grip 130 is a protruding structure of the controller 300 which the user grips in a hand to hold the controller 300. This configuration allows for the user to be able to grip the controller 300 between a palm and fingers (e.g., three or less fingers) while freeing up the thumb and, in some embodiments, another finger (e.g. the middle finger), for operating the user-input keys 120A, 120B and 120C. In some embodiments, the middle finger is freed to operate a trigger 190 mounted at least in part on the grip 130 as shall be described below.

In some embodiments, the grip 130 is integrally formed with the user-input surface 110 and/or the cage 140, as one part (e.g., which may be formed from molding).

In some embodiments, the grip 130 is slanted at an angle with respect to the user-input surface 110 (e.g., with a plane through the user-input surface or a portion thereof) in order to provide a comfortable (e.g., optimum) ergonomic balance for a user between holding the grip in a hand and using a thumb to operate the at least one user-input key.

In some embodiments, the cage 140 is coupled to the user-input surface 110. The cage 140, which may also be referred to as a tracking cage, has the outer surface 145 on which the plurality of illumination sources 150 is positioned.

In some embodiments, the grip 130 and/or cage 140 may be formed of an over-molded rubber material (e.g., so as to provide a surface providing sufficient friction with a user's palm thus improving the grip). In some embodiments, the grip 130 and/or cage 140 may be formed of a hard plastic, including, but not limited to high density polyethylene providing increased rigidity in structure. Additionally, any other suitable materials may be used.

In some embodiments, the cage 140 may be detachably coupled to at least one of the user-input surface 110 and the grip 130. The cage 140 may be slidably coupled to the user-input surface 110 through a protrusion spanning a width of each end portion of the cage 140 being slidably engaged with a corresponding groove positioned on an outer circumference of the user-input surface 110. The cage 140 may be coupled to the grip 130 through a fastening mechanism such as a bolt, a screw or the like. The detachable configuration of the cage 140 to the grip 130 or the user-input surface 110 yields the advantage of separating the aforementioned components for calibration as necessary. Detachable coupling of the components also allows for a separate and potentially cheaper manufacturing process of the parts. Furthermore, detachable coupling of the cage 140 to at least one of the user-input surface 110 and the grip 130 allows for separation thereof upon dropping of the controller 300, thereby reducing the need to replace the entire unit upon damage, but instead focus on fixing/replacing the separate damaged part.

In some embodiments, as illustrated in FIGS. 6A and 6B, the controller 300 may further comprise a structural web 195 coupling the cage 140 to the user-input surface 110. The large structural web 195 provides further rigidity in structure to the coupling between the cage 140 and the user-input surface 110 to mitigate damage and separation of these components upon dropping of the controller 300 by the user.

In some embodiments, a trigger 190 is mounted at least in part on the structural web 195. That is, the trigger 190 may be mounted between the structural web 190 and the grip 130. This configuration yields the advantage that the trigger is positioned adjacent to a location of a user's finger (e.g., middle finger) when the grip 130 is held in the neutral position. In some embodiments, the trigger may be both pushed and pulled by the middle finger, thus providing increased control in manipulating the trigger to achieve a desired action. The trigger 190 is an example of a user-input key.

Figure 7A:
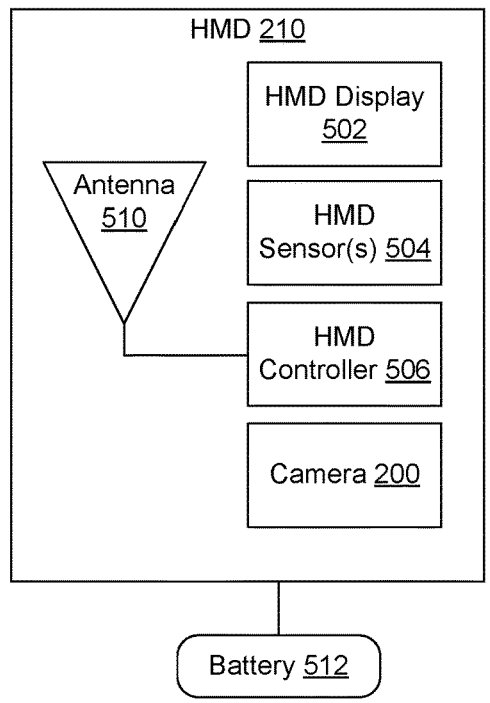
FIG. 7A is an electrical block diagram of an exemplary head-mounted display in accordance with some embodiments.

FIG. 7A is an electrical block diagram of an exemplary HMD 210 in accordance with some embodiments. The HMD 210 includes an HMD display 502, one or more sensors 504, a controller 506, and a camera 200. The controller 506 is coupled to an antenna 510 for wireless communication (e.g., with hand-held controllers 300). The HMD 210 (e.g., including the camera 200) is powered by a battery 512.

Figure 7B:
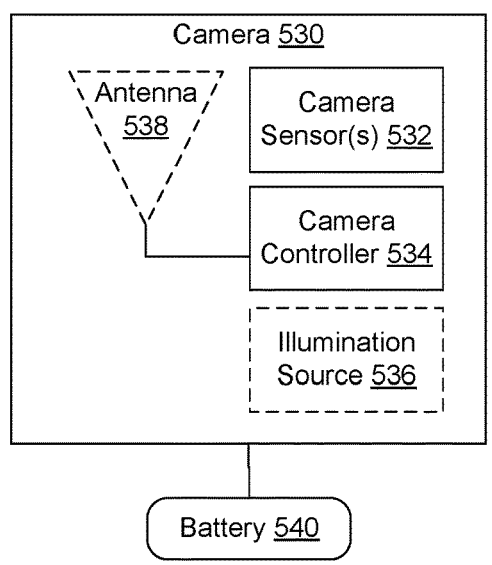
FIG. 7B is an electrical block diagram of an exemplary camera in accordance with some embodiments.

FIG. 7B is an electrical block diagram of an exemplary camera 530 in accordance with some embodiments. The camera 530 is an example of the camera 200. The camera 530 includes sensor(s) 532, a controller 534, and an optional illumination source (e.g., flash) 536. In some embodiments, the controller 534 is coupled to an antenna 538 for wireless communication (e.g., with an HMD 210 and/or hand-held controllers 300). In some embodiments, the controller 534 communicates with the HMD 210 using the flat flexible circuitry 220. The camera 530 is powered by a battery 540; alternatively, the camera 530 is powered by a battery it shares with the HMD 210 (e.g., battery 512, FIG. 5A).

Some embodiments are directed to two hand-held controllers 300—one to be held in each of a user's hands. In some embodiments, the two controllers 300 may be identical, but for a position of at least one of the user-input keys, so as to be adapted specifically for either a left or right hand in which the controller is to be held. The first controller thus may be a right-handed controller and the second controller may be a left-handed controller. In other embodiments, the two controllers may be agnostic with respect to handedness (e.g., with both controllers having the same configuration of user-input keys, or with one controller having a configuration of user-input keys different than the other).

In some embodiments, a virtual-reality system comprises a head-mounted display (HMD) 210, a camera 200 mounted on and protruding from a surface 240 of the HMD 210, and a compressible shock mount 230 mounting the camera 200 on the surface 240. The shock mount 230 is to retract the camera 200 towards the HMD 210 when compressed. The virtual-reality system further comprises flat flexible circuitry 220 electrically coupling the camera 200 to the HMD 210 as described previously. The flat flexible circuitry 220 passes from the camera 200, through the shock mount 230, to the HMD 210. The virtual-reality system further comprises a hand-held controller 300 including a plurality of illumination sources 150 which are configured to provide light that is detectable by the camera 200, and a power source (e.g. 512, 540) to supply power to the camera 200, the HMD 210 and the hand-held controller 300.

In some embodiments, the camera 200 comprises an illumination source to provide light to a plurality of passive reflectors on the hand-held controller, and a sensor to detect light reflected back to the camera 200 by the passive reflectors as previously described.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A virtual-reality system, comprising:
   a head-mounted display, wherein a surface of the head-mounted display includes an aperture;
   a camera protruding from the surface of the head-mounted display, wherein the camera includes a first portion that protrudes away from the surface of the head-mounted display through the aperture; and a compressible shock mount mounting the camera to the head-mounted display, the compressible shock mount to retract the camera towards the head-mounted display when compressed, wherein the camera includes a second portion that is coupled to the compressible shock mount and housed within the head-mounted display.

2. The virtual-reality system of claim 1, wherein the compressible shock mount is housed inside the head-mounted display.

3. The virtual-reality system of claim 1, wherein the first portion of the camera includes a lens for the camera.

4. The virtual-reality system of claim 1, wherein the compressible shock mount pivotally mounts the camera to the head-mounted display.

5. The virtual-reality system of claim 1, wherein the compressible shock mount translationally mounts the camera to the head-mounted display.

6. The virtual-reality system of claim 5, wherein the camera is translationally mounted to the head-mounted display to allow the camera to translate in multiple directions, in response to an impact.

7. The virtual-reality system of claim 1, wherein the compressible shock mount pivotally and translationally mounts the camera to the head-mounted display.

8. The virtual-reality system of claim 7, wherein:
the compressible shock mount pivotally mounts the camera so that first and second rotational degrees of freedom (DOFs) of the camera are tightly constrained as compared with a third rotational DOF; and
the compressible shock mount translationally mounts the camera so that first and second translational DOFs of the camera are tightly constrained as compared with a third translational DOF but are loosely constrained as compared with the first and second rotational DOFs.

9. The virtual-reality system of claim 8, wherein:
the compressible shock mount pivotally mounts the camera so that the camera is configured to be more precisely repositioned to an original position thereof in angular directions of at least one of the first and second rotational degrees of freedom (DOFs) than in an angular direction of the third rotational DOF; and
the compressible shock mount translationally mounts the camera so that the camera is configured to be more precisely repositioned to the original position thereof in lateral directions of at least one of the first and second translational DOFs than in a lateral direction of the third translational DOF.

10. The virtual-reality system of claim 1, wherein the compressible shock mount comprises a spring.

11. The virtual-reality system of claim 1, wherein the compressible shock mount comprises an elastic polymer.

12. The virtual-reality system of claim 1, wherein:
the surface is a front surface of the head-mounted display; and
the camera is a forward-looking camera.

13. The virtual-reality system of claim 12, wherein the forward-looking camera is mounted on the front surface via the compressible shock mount.

14. The virtual-reality system of claim 12, wherein the forward-looking camera is configured to detect a motion of at least one hand-held controller.

15. The virtual-reality system of claim 14, wherein the forward-looking camera is adapted to track light emitted by a plurality of light-emitting diodes (LEDs) on the at least one hand-held controller.

16. The virtual-reality system of claim 14, wherein the forward-looking camera is adapted to detect infrared light emitted by a plurality of infrared LEDs on the at least one hand-held controller.

17. The virtual-reality system of claim 14, wherein the forward-looking camera comprises:
an illumination source to provide light to a plurality of passive reflectors on the at least one hand-held controller; and
a sensor to detect light reflected back to the forward-looking camera by the passive reflectors.

18. The virtual-reality system of claim 1, further comprising flat flexible circuitry electrically coupling the camera to the head-mounted display, wherein the flat flexible circuitry passes from the camera, through the compressible shock mount, to the head-mounted display.

19. The virtual-reality system of claim 1, wherein the camera is an infrared camera.

* * * * *